April 15, 1941.　　　　G. W. SCOTT　　　　2,238,571
FRUIT JUICER
Filed Feb. 6, 1939
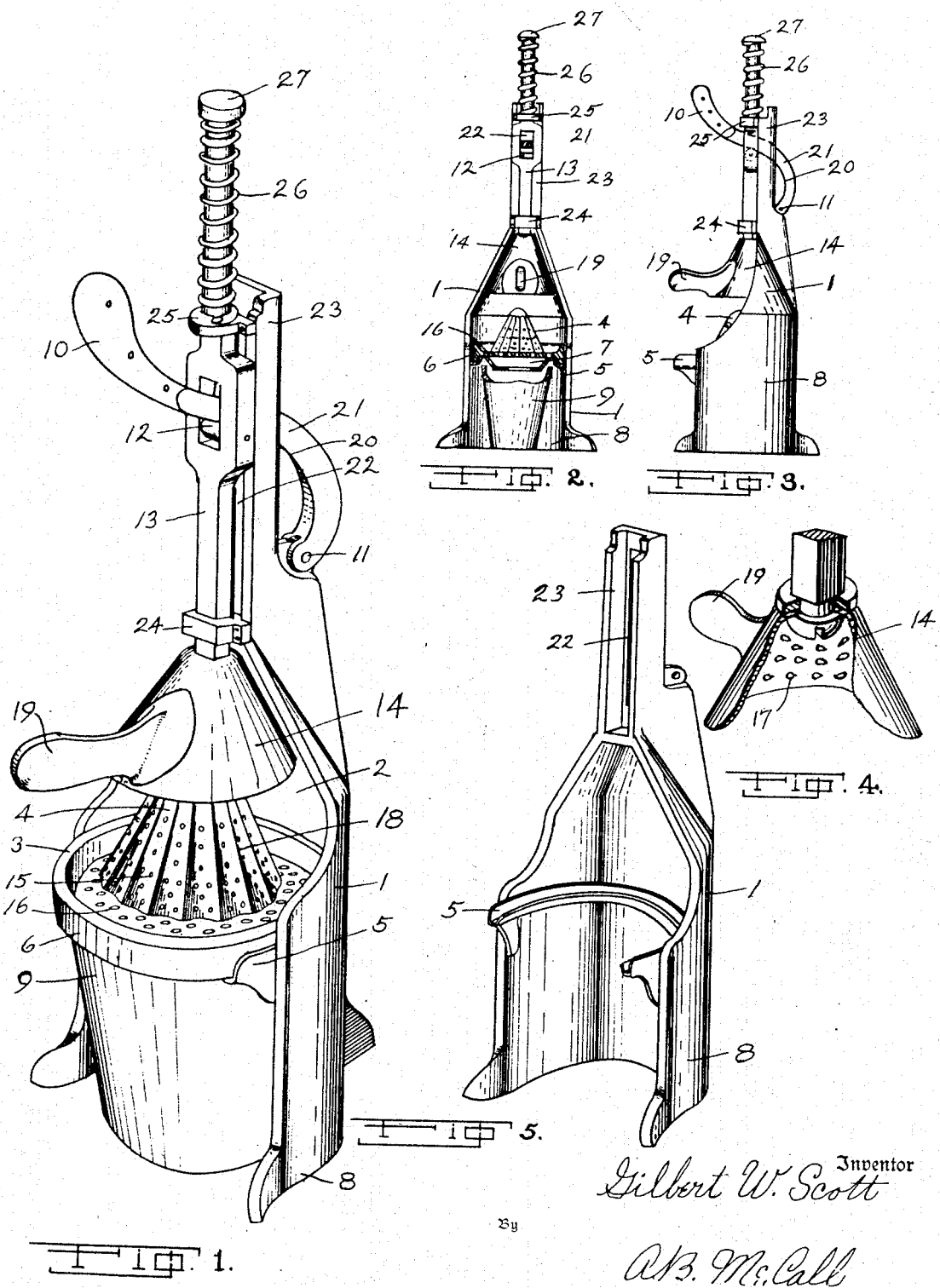
Inventor
Gilbert W. Scott
By
A. B. McCall
Attorney Patented Apr. 15, 1941

2,238,571

UNITED STATES PATENT OFFICE 2,238,571

FRUIT JUICER

Gilbert W. Scott, Franklin, Ill.

Application February 6, 1939, Serial No. 254,767

1 Claim. (Cl. 146—3)

My invention relates to devices for extracting juices from fruits and the like; an object being in my device to provide a practical and economical fruit juicer which is easily operated, convenient to handle, attractive in appearance and quickly adjusted to an operative position.

A particular purpose of my invention is to provide a fruit juicer that will be most effective in its operation, extracting juices from fruits with the desired results of its mechanical operation easily and simply obtained in a very practical and economical manner.

I attain the objects of my invention by the fruit juicer described in this specification, recited in the claim and illustrated in the accompanying drawing.

Referring to the drawing:

Fig. 1 is a perspective of my invention as when ready to use.

Fig. 2 is a front view of the same.

Fig. 3 is a side view of my fruit juicer.

Fig. 4 is a detail of the swivel-mounted cone shell showing in a cut-away the fruit engaging pins adapted to hold the fruit halves in place when they are being shifted from one side to the other over the perforated detachable cone for more completely extracting the juice therefrom.

Fig. 5 is a perspective of the upright frame operatively supporting the moving parts of my fruit juicer.

I shall now describe my improved fruit juicer as I refer to the drawing in a disclosure of the novel and salient features of its preferred construction.

An upright frame 1 is shaped to define a housing chamber 2 for detachably holding a perforated plate 3 having a roughened perforated cone member 4 over which a halved section of orange, lemon, grapefruit and the like, may be inverted for extracting the juice therefrom.

Plate 3 may be detachably engaged in the walls of chamber 2 in a slot defined by support member 5 and this plate has peripheral flanges 6 seating in the channel of support member 5 while a lower flange 7 of plate 3 is adapted to run the juice from fruits down into receptacle 9 without such juices spilling over the sides thereof.

In any event, plate 3 will be supported high enough above the bottom edge 8 of frame 1 to permit a juice receptacle 9 to be easily slipped in under perforated plate 3.

Thus, in order to explain the merits of my invention, I shall now explain the operative details thereof as the parts are functioning while squeezing the juice out of an orange, for instance.

The operator will place one-half of an orange, for instance, over the perforated fixed cone 4 and will then grasp handle 10 which is pivoted on pin 11 and resting upon roller 12 of the upright plunger 13 and will then pull down on handle 10 forcing swivel-mounted cone shell 14 down upon the inverted half of an orange squeezing the juice out of the same. The juice will then run through perforations 15 of cone 4 and 16 of plate 3.

Cone shell 14 has on its inner surface a series of inwardly projecting lugs or pins or ridges adapted to engage the section of orange on its outer surface to keep it from slipping. Pins 17 are illustrated here as a desirable means of accomplishing this purpose.

It will be noted that the fixed perforated cone 4 is provided with conically disposed ribs 18 adapted to more effectively work the juice out of the orange. After pressing down on handle 10 to remove the juice, that is possible to extract merely by pressure, then while holding cone shell 14 down on the orange the operator will shift lever 19 from one side to the other effectively moving the orange section from one side to the other pivotally over fixed cone 4 with the result that all of the orange juice is completely extracted from that section of orange.

The operator will then release handle 10 which has rolled down with its lower surface 20 riding roller 12 as the shank 21 of handle 10 swings through slot 22 of upright shank supporting post 23.

Thus, after this juice extracting operation where plunger 13 has been slidably moved downwardly through guide brackets 24 and 25, the coil spring 26 held in place by head 27 of plunger 13 will automatically retract plunger 13 up as far as it will go to its normally resting position.

I have thus shown a comprehensive operation of my invention wherein the simplicity of its construction and manipulation will very effectively accomplish the purposes thereof.

It is obvious that certain unimportant details of construction of my invention may be changed without departing from the spirit and scope thereof and if desired, a base plate may be provided along with frame 1 for supporting a juice receptacle 9 with such a plate rigidly or detachably secured to frame 1 or perforated lugs may be provided at the bottom of frame 1 for securing the same with screws, bolts and the like to a table, a shelf or bracket and the like.

Having thus described the nature of my invention, what I claim is:

A fruit juicer comprising in cooperative combination an upright U type of frame shaped to define a semi-annular channel bracket support for a removable perforated cone and juicer plate with said bracket disposed at a predetermined level above the base of said frame, and said frame further shaped to define an integral hood portion partially encompassing said cone and juicer member when the same is removably supported on said bracket and further shaped to define an integral upright lever supporting post having a vertical slot adjacent the top thereof, and a vertical guide channel, a vertical plunger slidably movable in said channel, a transverse roller in a slot of said plunger, a compression spring encompassing the top of said plunger for retracting the same, a swivel mounted cone squeeze cap pivotally and freely supported at the base of said plunger, and an S curved handle pivoted at its lower end to said frame and arched through said roller slot of said plunger over the roller and normally extending up and out from the front of said frame.

GILBERT W. SCOTT.